United States Patent [19]

Smith

[11] 4,114,868

[45] Sep. 19, 1978

[54] WORK ALIGNING VISE JAW

[76] Inventor: Daniel Wm. Smith, 1518 Euclid St., Santa Monica, Calif. 90404

[21] Appl. No.: 868,065

[22] Filed: Jan. 9, 1978

[51] Int. Cl.[2] ............ B23Q 3/02

[52] U.S. Cl. ............ 269/136

[58] Field of Search ............ 269/134–138

[56] References Cited

U.S. PATENT DOCUMENTS 3,785,635 1/1974 Lassy et al. ............ 269/136

FOREIGN PATENT DOCUMENTS 1,411,202 8/1965 France ............ 269/134

*Primary Examiner*—Robert C. Watson

*Attorney, Agent, or Firm*—William H. Maxwell

[57] ABSTRACT

The connection of work aligning jaw units for a machine vise and from which chips and debris are excluded by means of chambers formed at the interengaged faces of two relatively movable members in order to house the workings thereof, one a mounting member fixed to the vise abuttment or slide and the other a floating member limitedly biased upward in parallelism and slideably engaged with the mounting member on an inclined plane that draws a work piece downward when clamped.

16 Claims, 8 Drawing Figures

WORK ALIGNING VISE JAW

BACKGROUND

This invention relates to the jaws of vises used for holding work pieces in machine tools such as drill presses and milling machines and the like. Heretofore, the positioning of a work piece between the usual solid jaws of a vise has involved tapping and/or pounding of said work piece into place while clamping the same. However, there are vise jaws which pull downward while clamping thereby to draw the work piece against the vise bed or onto parallels, as the case may be; and such jaws have involved inclined cam action that exerts downward force, guide pins limiting motion of a moveable jaw face, and various apparatus with springs for biasing the moveable jaws face into an inactive position when released. Although the prior art draw-down jaws have their advantages, they are lacking in various respects; the moving jaws have been restricted in motion in the belief that this was necessary to maintain parallelism; the apparatus involved with assembly has been exposed to chips and debris; and manufacturing and assembly has been made difficult and/or complex. Therefore, it is an object of this invention to provide an improved draw-down vise jaw, relying upon the vise bed or parallels and the like to position the work piece, enclosing all working parts and members to the exclusion of chips and debris, and generally providing a replaceable and readily accessible jaw unit, either hardened or with a machinable soft face, all as circumstances require.

It is the said positioning of a work piece in a vise which is the primary object of this invention. The classic method of setting a work piece is to tap or hammer the same into position, with the result that the work piece is often pre-loaded and thereby deformed. That is for example, a work piece which is not perfect and which is pounded into position in a vise and then machined, will return to its imperfect form when released; and thus the imperfection is not removed by machining. Therefore, it is an object herein to provide jaw alignment during draw-down onto the bed or parallels and which provides positive gripping and which does not pre-load the part, so that any imperfection can be machined away.

With the present invention, the floating jaw elements slide free upon inclined planes of the fixed jaw elements while gripping the work piece to draw it into a seated position upon the bed or parallels, simultaneously compensating for slight variations from parallelism in said work piece. Thus, when a work piece with no taper is gripped the floating jaw elements draw down evenly, however when a tapered work piece is gripped either jaw may tip, to a degree, in order to conform to the taper of the part. A feature is that the bed or parallels supports the work piece while the floating jaw member is free, there being no positive stop therefor, during normal operation.

The accuracy of machine work depends greatly upon cleanliness and the exclusion of chips and debris from the tool elements which determine position of the work piece. This includes vise jaws per se which are the subject of this invention, it being an object herein to provide a fixed and floating jaw combination which excludes all chips and debris. With the present invention, there is a "unit" concept for the repeated accurate positioning of identicle work pieces and wherein two members are engageable at an inclined plane so as to establish a housing which accommodates the ancillary means necessary for mounting and for operation thereof. That is, the mounting screws which fasten the fixed jaw to the abuttment of the bed and to the slide of the vise are housed. And, the return stop means and bias means thereof are also housed, it being an object to provide cooperation between the stop means and bias means which maintains the closed condition of the two jaw members, as a housing. As will be described, the vise jaw members are cooperative to form an enclosure for all means involved, and to the exclusion of chips and debris, leaving all exposed sides thereof free and clear, and the working face uninterrupted. It is also an object to exclude chips and debris from beneath the floating jaw members, between it and the bed; and to this end a compressible filler occupies that interstice.

SUMMARY OF INVENTION

This invention is concerned primarily with a milling vise and provides the jaws therefor, one fixed and one moving. The jaw units are unlike, preferably identical, one to be fixed to the bed abuttment and the other to be fixed to the slide, said fixation placing the jaws in parallel opposition and one moveable relative to the other. In practice, the bed of the vise is normally horizontal and used to directly support a work piece or through parallels, all as may be required. The slide is moved by a screw or the like to clamp the work piece between the jaws, during which operation it is usual shop practice to tap, hammer and/or otherwise pound the work piece into position. However, pounding is unnecessary with the present invention which employs jaw units that draw down while simultaneously clamping the work piece. In accordance with this invention, the jaws are alike and each comprised of a pair of members slideably engaged at an inclined plane extending downwardly and outwardly with respect to the work piece to be clamped. There is a mounting member A to be fixed to the bed abuttment or slide, and there is a floating face member B to be carried by the member A. The mounting screws S are confined to member A, while the stop means C and bias means D are confined to the opposed inclined faces of the two members. The working face of the floating member B can remain flat and totally uninterrupted, as are the side and top faces of the two members. Hold-down means E is provided for immoveable securement of the members one to the other, for enabling work to be performed thereon, such as refacing or any modification necessary to adapt the same to a work piece.

DRAWINGS

The various objects and features of this invention will be fully understood from the following detailed description of the typical preferred form and application thereof, throughout which description reference is made to the accompanying drawings, in which.

PREFERRED EMBODIMENT

Figure 1:
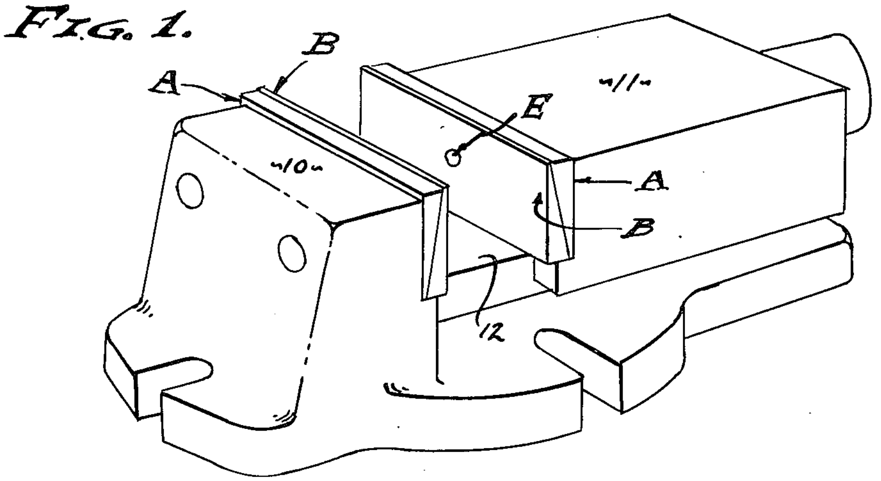
FIG. 1 is a perspective view of the work aligning vise of the present invention.
Figure 2:
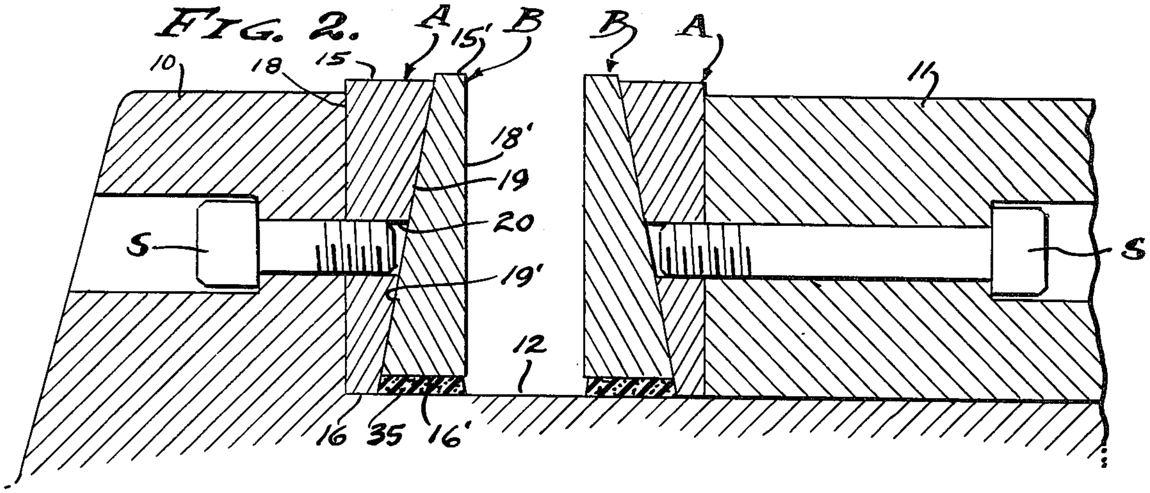
FIG. 2 is an enlarged longitudinal sectional view taken through the work clamping portion of the vise.
Figure 3:
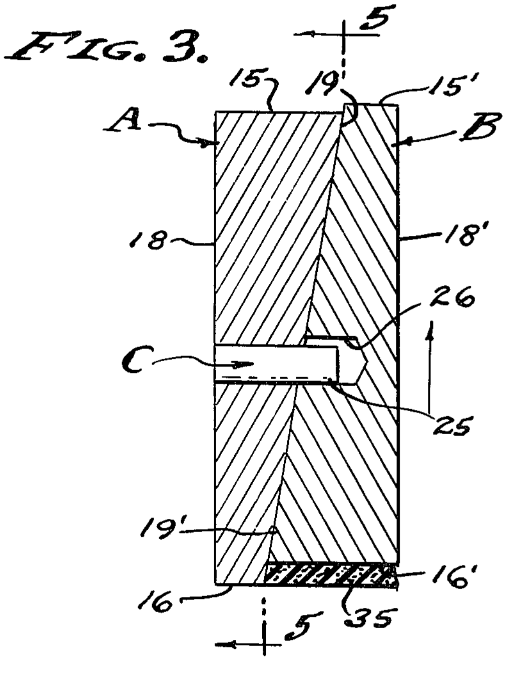
FIGS. 3 and 4 are enlarged detailed sectional views of the vise jaws shown in FIGS. 1 and 2.
Figure 4:
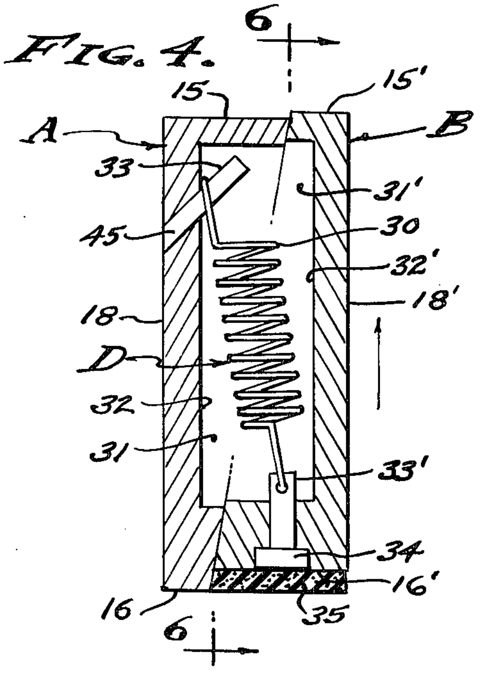
Figure 5:
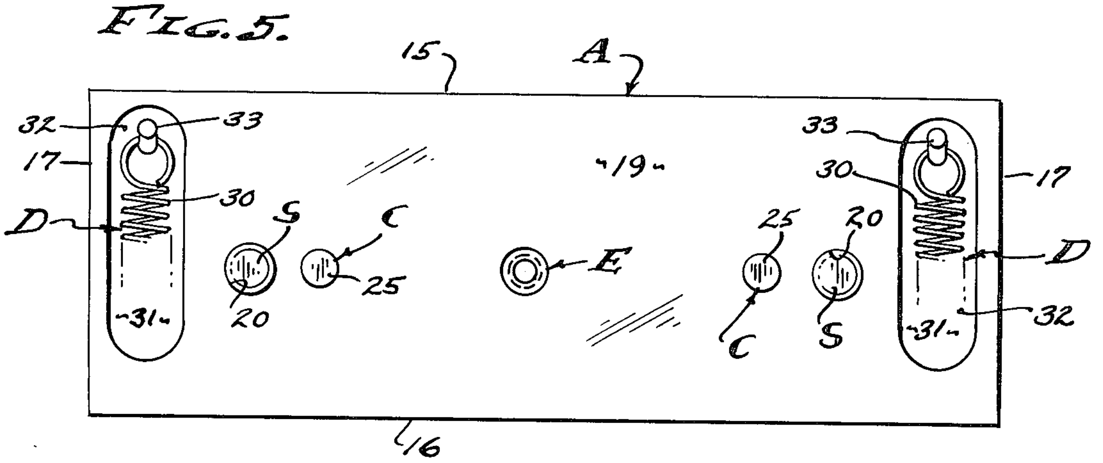
FIG. 5 is an elevation taken as indicated by line 5—5 on FIG. 3.

Referring now to the drawings, the jaw units of the present invention are to be used on milling vises and the like, applied to the bed abuttment 10 and to the slide 11 opposed thereto. The bed 12 extends longitudinally of the vise in a horizontal plane, and the abuttment 10 and slide 11 extend transversely over the bed and in vertical parallel planes. There are several methods of jaw attachment, either through the jaw faces or through the abuttment and slide; both of which are adaptable to the present fixed and floating member combination. In practice there will usually be a pair of laterally spaced screw fasteners S, shown herein as entered through the abuttment and slide and threaded into the fixed mounting member A.

The jaw members A and B are like wedges of rectangular form. That is, they can be dimensionally the same, each having parallel top and bottom sides 15–15′ and 16–16′, and each having parallel ends 17–17′. Each member has a normal face 18–18′ the face 18 of member A being the mounting face and the face 18′ of member B being the work engaging face. In accordance with this invention, each member has a complimentary inclined face 19–19′, 10° being a suitable degree of inclination, the faces 19 of opposed jaws being downwardly divergent with respect to each other. Accordingly, the top sides 15 of the mounting members A are wide while the bottom sides 16 are narrow; and on the contrary, the top sides 15′ of the floating members B are narrow while the bottom sides 16′ are wide. It is significant that when the members A and B are assembled in alignment they present a rectangular solid characterized by the inclined line of joinder and by the fastener openings 20 which extend through the mounting member A.

The stop means C is provided to limit upward movement of member B relative to member A, and to restrict the same in a horizontal position when so raised. As shown, a pair of laterally spaced pins 25 project horizontally from one member to engage in laterally spaced openings 26 in the other member. The pins 25 shown projecting from the mounting member A are smaller in diameter than the complimentary openings 26 in member B, the difference limiting the travel of member B relative to member A. In practice, the pins 25 fully occupy the holes in which they are installed.

The bias means D is provided to yieldingly urge the floating member B upwardly with respect to the mounting member A, and in practice is a spring means balanced and preferably comprised of a pair of laterally spaced tension springs 30 operable to extend diagonally within the confines of the two jaw members to couple them together while urging the same into a lifted or retracted position. It is feasible, for example, to employ a single spring (not shown), however with the pair of springs 30 there is a uniform lifting action by calibrating the springs to establish equilibrium. Accordingly, a spring housing 31–31′ is formed into each end of the member A and B, opening one into the other at the inclined faces 19 and 19′ thereof so as to be opposed and complimentary in order to establish two laterally spaced chambers having opposed and spaced bottom walls 32 and 32′. The housings 31–31′ are substantially the full height of the jaw members in which they are formed, there being spring anchors 33–33′ at the deep end of each housing, or at the wide top and bottom of the jaw members respectively. In carrying out this invention, the anchors 33 of the mounting member A are releasable hooks while the anchors 33′ of the floating member capture the looped spring ends. In practice, tension springs 30 looped at opposite side ends are employed, captured by headed pins 34 entering through the floating member B, and releasably engaged by slanted pins 45 forming the hooks in the mounting member A.

In carrying out this invention, the floating jaw member B raises from the bed plane when retracted for the reception of a work piece, thereby establishing an interstice subject to being jammed with chips and debris; and such an interstice of any size is a detrament. Accordingly, the bottom side 16′ of the jaw member B is diminished so as to provide space for the insertion of a compressible member 35 that substantially and/or fully occupies the same. An elastomer that is impervious to the machine fluids is employed, and one that is in itself or by nature of its construction compressible or collapsible, while maintaining full occupancy of the interstice. In practice, therefore, the side 16′ remains spaced from the bed 12 so as to provide for the compressed or collapsed volume of the chip excluding member 35.

Figure 6:
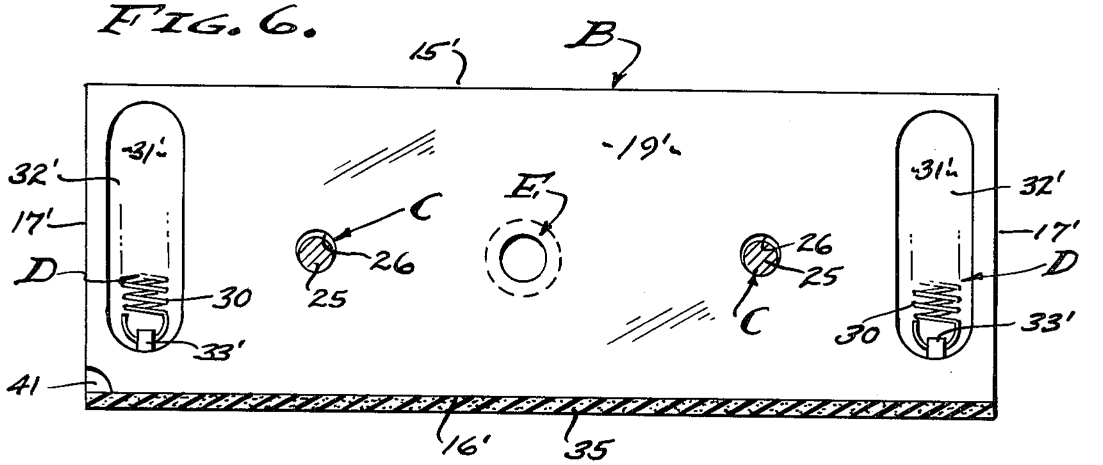
FIG. 6 is an elevation taken as indicated by line 6—6 on FIG. 4.
Figure 7:
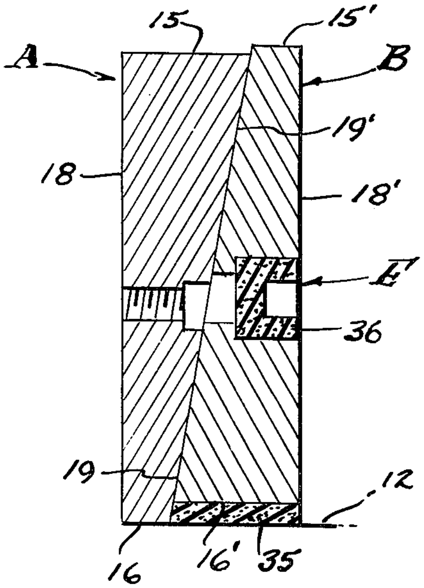
FIG. 7 is an enlarged detailed sectional view taken through the center lock means of the vise jaw in its normal work-ready condition.
Figure 8:
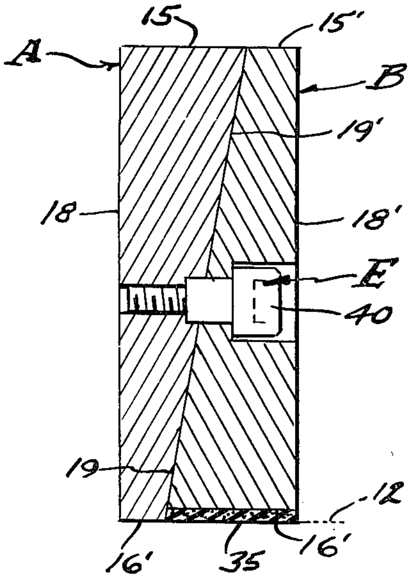
FIG. 8 is a view similar to FIG. 7 showing the locked position thereof.

Service, inspection and refacing or modification of these jaws is enabled and facilitated by aligning the jaw units with lock means E. Also there may be instances where it is desired to immobilize one or both jaw units during a work holding operation. To these ends therefore, one or more pins or screw fasteners 40 are secured through the jaw members A and B as shown in FIG. 8, holding them aligned with the top sides 15 and 15′ coplanar, in which condition the jaw unit comprised of the two members presents a rectangular solid appearance (excepting the reduced side 16′ accommodating the inserted member 35). In practice, a central shouldered screw 40 clamps the jaw members A and B together and secures the pins 25 stopped against the walls of the openings 26, and in which condition the jaw units are located by the cylindrical shank of the screw and immobilized. When the screw fastener is withdrawn as shown in FIG. 7, or removed, the jaw member B is free to float, and is separable from jaw member A by a prying action facilitated by a recess 41 engageable with a sharp tool or fingernail, see FIG. 6, thereby separating said members. In practice an elastomer plug 36 is inserted as shown in FIG. 6, in order to exclude all foreign matter and debris.

From the foregoing it will be seen that it is a simple matter to install the mounting member A upon the bed abuttment 10 and slide 11 of the vise, by simply threading the screws S into or through the openings provided therefor. As shown, the fastener screws S stop short of the inclined plane 19, whereby the members B are free to slide thereon. The cooperative assembly of members A and B is then made by offering up each member B into proximate position with the spring or springs 30 extending therefrom to be engaged with the hooked pin or pins which comprise the anchor or anchors 33, whereupon the members B are manually forced down for engagement of the stop pins 25 in the openings 26 that limit return movement imposed by said springs, when releasing the members B which are drawn into inclined interface engagement with members A at faces 19–19′. It is a simple matter to remove the floating members B, by prying them from members A along the bottom sides 16–16'.

In use, there are virtually no interstices into which chips and debris can be lodged or collected, yet the descrete motion of the floating jaw members is in no way restricted. In practice, the depression of members B will be small, not to exceed 0.010 to 0.020 inch, and this will vary from side to side as parallism is automatically adjusted to. Further, with the release of one work piece, the jaw units are automatically prepared for clamping onto the next work piece, all as circumstances require.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A work aligning jaw for a machine vise, including; a mounting member with means for securement to the vise, and a floating member carried on the mounting member and slideably engaged therewith at a plane downwardly and outwardly inclined with respect to a work piece to be clamped in said vise, at least one chamber opening into one of said jaw members and spaced within the boundaries of the slideably engageable inclined plane thereof, bias means confined within the chamber and yieldingly urging the floating member together and upward with respect to the mounting member, and stop means limiting said upward movement of the floating member, whereby the work piece being clamped by the floating member is drawn downward to the vise.

2. The work aligning vise jaw as set forth in claim 1, wherein the two said jaw members are rendered immobile with respect to each other by releasable fastener means engaged therebetween.

3. The work aligning vise jaw as set forth in claim 1, wherein the bias means comprises a spring that extends diagonally between said members within the said chamber therefor.

4. The work aligning vise jaw as set forth in claim 1, wherein the bias means comprises a tension spring that extends diagonally between said members within the said chamber therefor.

5. The work aligning vise jaw as set forth in claim 1, wherein the bias means comprises a tension spring anchored permanently toward the lower side of the floating member and releasably hooked to and toward the upper side of the mounting member.

6. The work aligning vise jaw as set forth in claim 1, wherein the bias means comprises transversely spaced springs that extend diagonally between said members within laterally spaced chambers therefor.

7. The work aligning vise jaw as set forth in claim 1, wherein the bias means comprises transversely spaced tension springs that extend diagonally between said members within laterally spaced chambers therefor.

8. The work aligning vise jaw as set forth in claim 1, wherein the bias means comprises transversely spaced tension springs anchored permanently within laterally spaced chambers therefor toward the lower side of the floating member and releasably hooked to and toward the upper side of the mounting member.

9. In combination, a pair of work aligning vise jaw units for installation on the opposed faces of a machine vise abuttment and slide thereof, and each jaw unit including; a mounting member with means for securement to the vise abuttment and slide respectively, and a floating member carried on the mounting member and slideably engaged therewith at a plane inclined with respect to a work piece to be clamped in said vise, said planes at opposite vise jaw units being downwardly and outwardly divergent with respect to each other, at least one chamber opening into one of said jaw members and spaced within the boundaries of the slideably engageable inclined plane thereof, bias means confined within the chamber and yieldingly urging the floating member together and upward with respect to the mounting member, and stop means limiting said upward movement of the floating member, whereby the work piece being clamped by the floating member is drawn downward to the vise.

10. The combination of work aligning vise jaw units as set forth in claim 9, wherein the two said jaw members of each unit are rendered immobile with respect to each other by releasably fastener means engaged therebetween.

11. The combination of work aligning vise jaw units as set forth in claim 9, wherein the bias means of each unit comprises a spring that extends diagonally between said members within the said chamber therefor.

12. The combination of work aligning vise jaw units as set forth in claim 9, wherein the bias means of each unit comprises a tension spring that extends diagonally between said members within the said chamber therefor.

13. The combination of work aligning vise jaw units as set forth in claim 9, wherein the bias means of each unit comprises a tension spring anchored permanently toward the lower side of the floating member and releasably hooked to and toward the upper side of the mounting member.

14. The combination of work aligning vise jaw units as set forth in claim 9, wherein the bias means for each unit comprises transversely spaced springs that extend diagonally between said members within laterally spaced chambers therefor.

15. The combination work aligning vise jaw units as set forth in claim 9, wherein the bias means of each unit comprises transversely spaced tension springs that extend diagonally between said members within laterally spaced chambers therefor.

16. The combination of work aligning vise jaw units as set forth in claim 9, wherein the bias means of each unit comprises transversely spaced tension springs anchored permanently within laterally spaced chambers therefor toward the lower side of the floating member and releasably hooked to and toward the upper side of the mounting member.

* * * * *